March 19, 1968   K. RÄNTSCH ET AL   3,374,046

READING MICROSCOPE WITH INTERPOLATION PRISM

Filed March 26, 1964

INVENTORS:
Kurt Räntsch
Adolf Weyrauch
BY Singer, Stern & Carlberg
ATTORNEYS

United States Patent Office 3,374,046
Patented Mar. 19, 1968

3,374,046
READING MICROSCOPE WITH INTERPOLATION PRISM
Kurt Räntsch, Heidenheim, and Adolf Weyrauch, Wetzlar, Germany, assignors to Carl-Zeiss Stiftung, Wurttemberg, Germany, a corporation of Germany
Filed Mar. 26, 1964, Ser. No. 355,044
Claims priority, application Germany, Mar. 29, 1963,
Z 10,023
3 Claims. (Cl. 350—112)

ABSTRACT OF THE DISCLOSURE

A reading microscope comprising a microscope objective, a parallel mirror arrangement consisting of two similar rhombic prisms arranged to be rotatable about the optical axis of the objective, a transparent measuring scale arranged between said two rhombic prisms and having at least one scale line adapted to be projected by one rhombic prism of said mirror arrangement into the microscope, a servo system controlled by a photoelectric cell for rotating said mirror arrangement so as to bring the image of said scale line in coincidence with a fixed mark in the object plane of the microscope, and means for passing a beam of illuminating light through the other one of said rhombic prisms and through said transparent measuring scale.

---

The invention relates to a reading microscope for measuring scales in which the measured value is determined either subjective on the scale of a measuring scale or photoelectrically by bringing a scale line into coincidence with an edge or a slit.

In such measurements the cases are an exception in which during a measurement a coincidence takes place between an index, an edge or a slit with a scale line. It is generally necessary to interpolate between two scale lines or line-like indicators. For interpolation one has used heretofore optical means comprising exclusively plane parallel plates or similar devices which mostly produce substantial imaging errors and therefore are used solely for small measurement ranges or for measurements which do not have to be very accurate.

It is an object of the invention to combine the objective of the reading microscope with a parallel mirror arrangement which is rotatable about the optical axis of the microscope. This parallel mirror arrangement projects the image of a scale line by means of a measurable rotative movement of the mirror arrangement in coincidence with a stationary index, an edge or a slit in the object plane or image plane of the microscope.

According to another object of the invention, the parallel mirror arrangement is formed by a rhombic prism whose parallel flanks effect a double reflection of the scale line which is projected. The optical axis of the microscope forms also the axis of rotation of the reflector system and intersects this axis of rotation at the point of the second reflection as is illustrated in the figures of the drawing.

It has been discovered that when in a photoelectric arrangement the light rays pass through a transparent carrier which has a scale thereon that measuring errors may occur owing to the fact that the illuminated area is not completely homogeneously bright. It is therefore a further object of the invention to eliminate such errors by placing between the source of illumination—which includes a condenser—of the microscope and the measuring scale a similar mirror system, with the aid of which during the rotation of the first mentioned prism a similar displacement of the illuminated area is effected, so that always the same point of the illuminated area furnishes the light beam for illuminating the viewing area of the microscope within the range of said edge or slit.

When employing a top illumination the interpolation prism is preferably employed not only in the illumination portion but also in the viewing portion of the microscope, so that any undesirable effects of a non-homogeneous illumination area are eliminated.

When determining the value of the measurement in a photoelectric manner the rotation of the prism is effected by means of an automatic resetting control arrangement which, by way of example, will always come to a stop when the image of the scale line appears symmetrically within a slit diaphragm provided in the object plane or picture plane of the microscope.

Still another object of the invention is to make the arrangement insensitive against tilting, in that a plane-parallel glass plate is employed, which for instance is cemented to the light admitting or to the light outlet face or to both said faces of the prism, to fulfill the condition $d/h=n$, where $h$ is the distance between the light admitting surface and the light outlet surface, $n$ is the refractive index of the glass of the body and $d$ is the length of the way of the light in the body. The insensitiveness against tilting may also be obtained by a particular shape of the prism (see FIG. 1) without cemented plane parallel glass plate. The said condition in this case is fulfilled if the angle $u$ between the first reflecting surface of the prism and the light admitting surface is so chosen that $$\text{sinus } u = \sqrt{\frac{1}{n}}$$

For instance if $n=1.5$ then $u=55°$.

With these and other objects in view as will appear hereinafter, the invention will now be further explained with reference to the accompanying drawings, in which.

Figure 1:
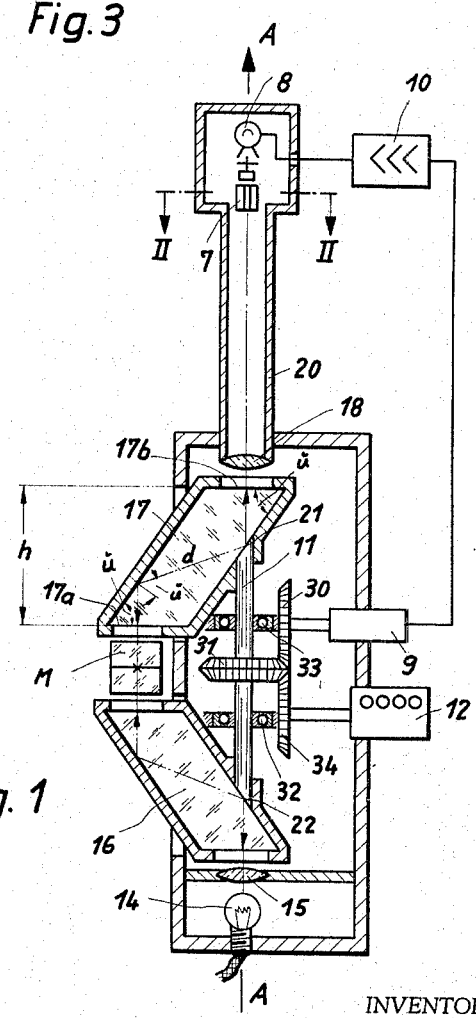
FIGURE 1 illustrates in a partly sectional view a photoelectric microscope with a measuring scale, prism for interpolation and another prism for illumination.

The arrangement illustrated in FIG. 1 includes a transparent measuring scale carrier M shiftable in the direction of arrow B relative to a microscope 20. The scale carrier is illuminated by a source of light 14 of the microscope 20 by means of an illuminating lens 15 and a rhombic prism 16. One of the scale strokes S' is imaged by an objective 18 on a diaphragm 7 by the aid of a further rhombic prism 17. To get a symmetrical position of the image of the scale stroke with respect to the slit of the diaphragm 7 after each shift of the scale M the rhombic prism 17 is turnable about the optical axis A—A of the objective 18. The rotation of the rhombic prism 17 is effected by means of an automatic resetting control arrangement which is energized by a photoelectric cell 8, the photo current of which is suitably amplified by the amplifier 10 before reaching a motor 9. Motor 9 turns over a gear 30, 31 a shaft 11 carrying the prisms 16 and 17. Shaft 11 is arranged in ball bearings 32 and 33, so that the prisms 16 and 17 turn about the axis A—A of the microscope 20. This axis intersects the second reflection point 21 of the interpolation prism 17 and also the first reflection point 22 in the prism 16.

In an arrangement in which the measuring scale is illuminated from above, the illuminating prism 16 may be omitted. In the arrangement illustrated in FIG. 1 a light beam which passes through the measuring scale the illuminating prism 16 rotates simultaneously with the interpolation prism 17 and effects therefore a uniform displacement of the illuminated area of the scale so that always the same point of the area used is illuminated by light which reaches the viewing area of the microscope within the range of the slit diaphragm. The size of the angular rotation is again indicated by counter mechanism 12 which indicates the scale division following the decimals. Counter mechanism 12 is actuated by wheel 31 over a wheel 34 meshing with wheel 31.

The illustrated rhombic interpolation prism 17 is provided with a reflection angle $u$ of about 55° and the glass of the prism 17 has a refractive index of about $n=1.5$ so that $$\sin u = \sqrt{\frac{1}{n}}$$

If this condition is fulfilled, then the further condition is fulfilled $d/h=n$, $d$ being the length of the light path in the prism 17 and $h$ being the distance between the light entrance surface 17a of this prism and the light outlet surface 17b as explained above. This means that a tilt of the prism 17 about an axis lying for instance perpendicular to the axis A—A occurs no shift of the image of the scale stroke. It is noted that the tilt angle E is assumed to be so small that pin E and tan $E$ may be replaced by E and cos $E$ may be replaced by the value 1.

Figure 3:
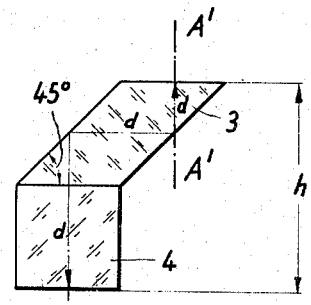
FIG. 3 illustrates an altered interpolation prism.
Figure 2:
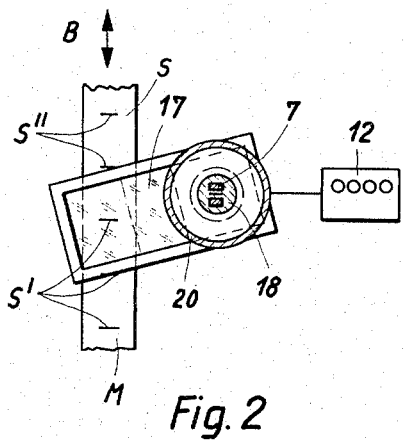
FIG. 2 is a section along the line II—II of FIG. 1.

FIG. 3 illustrates an interpolation prism 3 provided with a reflection angle $u$ of 45°. In order to make this prism 3 insensitive to undesirable tilting movements the condition $d/h=n$ again must be fulfilled. This is reached in that it has cemented to its light ray admitting surface a rather thick plane parallel glass plate 4. The prism and plate combination is rotatable about the microscope axis A'—A', as described in FIG. 1.

Figure 4:
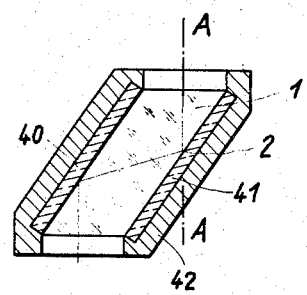
FIG. 4 shows an altered embodiment of the invention.

FIG. 4 shows an altered embodiment of the invention in that the interpolation prism 3 or 17 of FIGS. 3 or 1 is replaced by two mirrors 40 and 41 arranged in a housing 42. Housing 42 is fixed to the shaft 11 of FIG. 1.

We claim:

1. In a reading microscope, the combination comprising a microscape objective, an illuminating system arranged in spaced and axial alignment with said microscope objective, a parallel mirror arrangement disposed between said microscopic objective and said illuminating system, means for rotating said mirror arrangement about the optical axis of said microscope objective, said mirror arrangement including two axially aligned similar rhombic prisms, each having two parallel end faces disposed perpendicular to said optical axis and two parallel deflection faces arranged inclined to said optical axis and said prisms being so proportioned that the two parallel end faces and the neighbored respective deflection faces of each of the rhombic prisms include an angle $u$ such that $$\sin u = \sqrt{\frac{1}{n}}$$

$n$ being the index of refraction of the rhombic prisms, one of said rhombic prisms being arranged with its lower end face in front of said illuminating system for illuminating a transparent measuring scale carrier arranged between its upper end face and the lower end face of the other rhombic prism whose upper end face is arranged below said microscope objective, said measuring scale carrier having at least one scale line adapted to be projected into said microscope objective, said first named rhombic prism having a first reflection point and said other rhombic prism having a second reflection point, both said reflection points being arranged in spaced relation in said optical axis about which said two rhombic prisms are simultaneously rotatable, a diaphragm having a slit therein and being arranged above said microscope lens in the image plane thereof, a photoelectric cell being arranged above said diaphragm for being energized by the light projected by said microscope lens through said diaphragm, and means operated by the energized photoelectric cell to control said means for rotating said mirror arrangement, said rotating mirror arrangement being effective to project an image of said scale line on said scale carrier in coincidence with the slit in said diaphragm.

2. A reading microscope according to claim 1, including a counter mechanism operated by said means for rotating said mirror arrangement for indicating the angular rotation of the said mirror arrangement.

3. A reading microscope according to claim 1, in which said illuminating system comprises a source of light and an illuminating lens arranged between said source of light and the lower end face of said first mentioned rhombic prism.

References Cited

UNITED STATES PATENTS

| | | | |
|---|---|---|---|
| 2,870,671 | 1/1959 | Falconi | 250—236 X |
| 3,015,249 | 1/1962 | Taylor | 88—2.4 X |
| 3,030,857 | 4/1962 | Shumway | 350—287 X |
| 3,055,263 | 9/1962 | Kuehne | 350—113 X |
| 3,161,715 | 12/1964 | Davidson | 88—14 |

JEWELL H. PEDERSEN, *Primary Examiner.*

W. A. SKLAR, *Assistant Examiner.*